United States Patent [19]

Schneider

[11] Patent Number: 5,183,351
[45] Date of Patent: Feb. 2, 1993

[54] BOOT RETAINER FOR A MECHANICAL JOINT

[75] Inventor: Dean J. Schneider, Highland, Mich.

[73] Assignee: GKN Automotive, Inc., Auburn Hills, Mich.

[21] Appl. No.: 734,599

[22] Filed: Jul. 23, 1991

[51] Int. Cl.⁵ .................. F16J 15/52; F16L 51/02
[52] U.S. Cl. ......................... 403/50; 403/51; 403/137; 277/212 FB; 464/171
[58] Field of Search .............. 403/27, 50, 51, 137; 464/171, 173, 175, 144, 146; 277/212 FB; 24/130 R

[56] References Cited

U.S. PATENT DOCUMENTS

| | | | |
|---|---|---|---|
| 2,290,776 | 7/1942 | Stillwagon, Jr. | 403/50 X |
| 3,208,779 | 9/1965 | Sullivan, Jr. | 403/134 |
| 3,359,014 | 12/1967 | Clements | 403/50 X |
| 3,378,287 | 4/1968 | Ulderup | 403/51 |
| 3,441,298 | 4/1969 | Herbenar et al. | 403/134 |
| 3,476,417 | 11/1969 | Born et al. | 403/134 |
| 3,822,570 | 7/1974 | Fisher | 64/32 R |
| 3,830,083 | 8/1974 | Hadick et al. | 64/32 F |
| 3,914,852 | 10/1975 | Fisher | 29/508 |
| 4,201,391 | 5/1980 | Bankstahl | 277/212 FB |
| 4,386,869 | 6/1983 | Smith | 403/134 X |
| 4,747,805 | 5/1988 | Welschot et al. | 403/50 X |
| 4,946,303 | 8/1990 | Sawicki | 403/50 |

Primary Examiner—Dave W. Arola
Assistant Examiner—Heather Chun
Attorney, Agent, or Firm—Harness, Dickey & Pierce

[57] ABSTRACT

A constant velocity joint has a low profile boot retainer which seals and retains a boot on the joint. The boot retainer also retains the joint's internal components within the outer race. The low profile feature allows for the use of this boot retainer when space is at a premium. The retainer has an inner and outer band which sandwich the rubber or plastic boot between them and provide a seal between the boot and the constant velocity joint outer race.

5 Claims, 3 Drawing Sheets

BOOT RETAINER FOR A MECHANICAL JOINT

BACKGROUND OF THE INVENTION

This invention relates to a boot or seal retainer for a power transmitting mechanical joint. More particularly, this invention relates to a motor vehicle constant velocity joint outer race boot or seal retainer.

Most vehicles with independent suspension use a halfshaft assembly to transmit power from the engine to the drive wheels. This halfshaft assembly normally has a pair of mechanical joints, one at each end and an interconnecting shaft between the two joints. These mechanical joints are generally constant velocity universal joints.

Most constant velocity universal joints, irrespective of their design, require a continuous supply of grease to operate. These joints use a flexible boot, made from rubber or plastic materials to seal a cavity between the constant velocity universal joint outer race and the interconnecting shaft to which the boot is sealingly engaged. During assembly of the halfshaft, the cavity is filled with a specified type and amount of grease. This supply of grease is expected to lubricate the internal components of the joint for the life of the vehicle. Because this joint is sealed for life, the reliability and integrity of the sealing engagement with both the interconnecting shaft and the joint outer race is critical.

Current boots are designed to interface with grooves on both the interconnecting shaft and the outer race. Once the boot has been located in these grooves, a clamp similar to one shown in U.S. Pat. No. 3,402,436 issued to Oetiker is placed around the boot and outer race and around the boot and shaft. These clamps are then tightened to complete the sealing engagement of the boot.

FIGS. 1 and 2 shows a typical constant velocity universal joint 10 incorporating a prior art sealing arrangement. The boot 12 forms a cavity 14 between the constant velocity universal joint 10 and the interconnecting shaft 16.

The boot 12 has a portion located in a groove 20 machined into the outer surface 22 of the joint outer housing 18. The boot 12 has a second portion located in a second groove 26 in the outer surface 28 of the shaft 16. The boot 12 is sealingly engaged to both the joint outer housing 18 and the shaft 16 by clamps 24 and 30, respectively. A retaining ring 32 is positioned in the interior surface of the housing 18 to retain joint inner race 34, joint cage 36 and balls 38 inside the joint outer housing 18. This design significantly increases the outer profile beyond the outer surface 22 of the joint outer race 18 and requires the addition of the retaining ring 32 to retain the joint internal components 34, 36 and 38.

While the present Omega clamp positioned around the outer race and interconnecting shaft functions satisfactorily, it has several disadvantages. One disadvantage of the Omega clamp is that during the assembly of the joint, the internal components are free to move with respect to the outer race. In the past, a retention mechanism such as the snap ring described above or the like, has been required to retain the internal components inside the outer race. Use of the boot itself for retention has proven to be unreliable for maintaining the components within the joint. Another disadvantage is that the Omega clamp, with its deformable ear, extends from the surface of the joint. In applications where space is at a premium, this extension interferes with the clearance of the rotating joint. While other low profile clamps have been proffered, they require the addition of boot thicknesses and clamp thicknesses to the outside diameter of the outer race. This adds to the overall swing diameter of the joint outer race assembly.

Accordingly, it is desirable to have an assembly which overcomes the present disadvantages. The present invention provides the art with a retention mechanism which retains the internal components within the joint during the assembly of the joint to the halfshaft as well as during assembly of the halfshaft into the vehicle. Also, the present invention provides a low profile boot retention system which requires only the addition of one thickness of the boot retainer to the outside diameter of the constant velocity universal joint outer race.

From the following detailed description, drawings and subjoined claims, other objects and advantages of the present invention will become apparent to those skilled in the art.

DETAIL DESCRIPTION OF THE INVENTION

Figure 3:
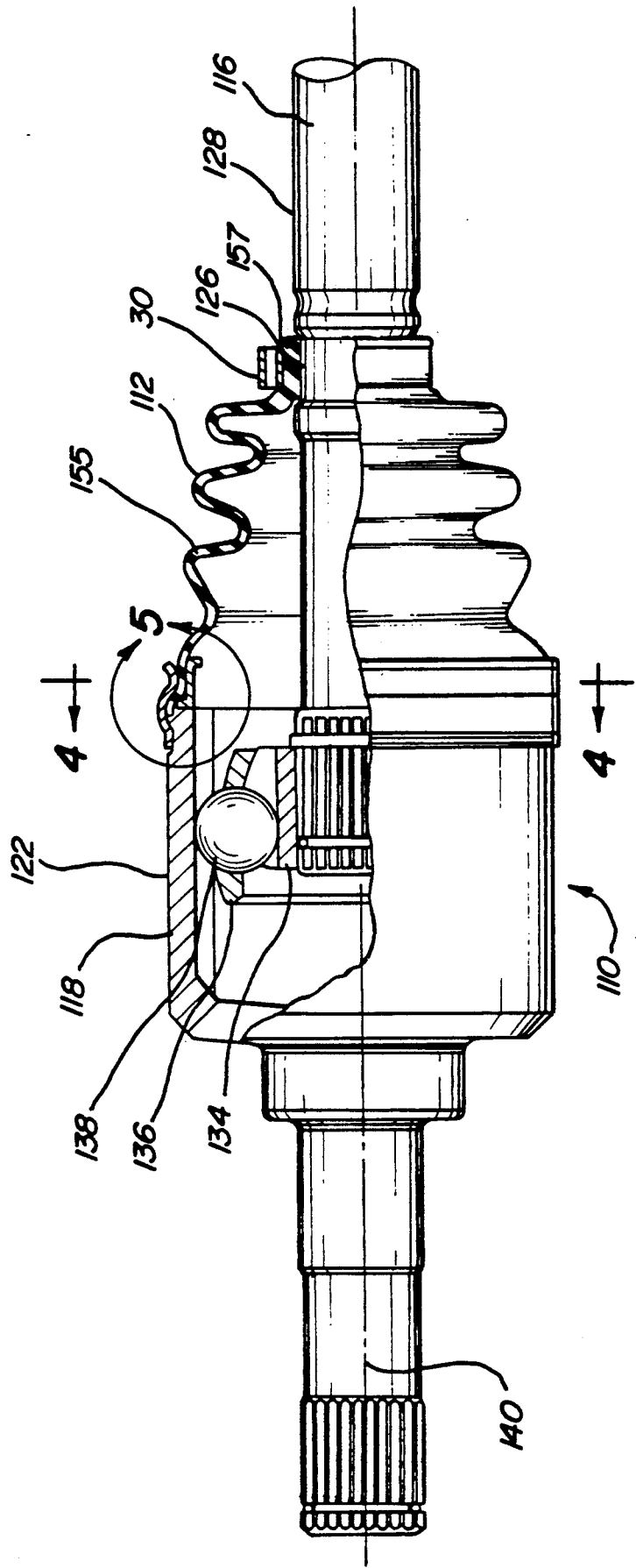
FIG. 3 is a side elevation view partially in cross section view of a constant velocity universal joint according to the present invention.
Figure 4:
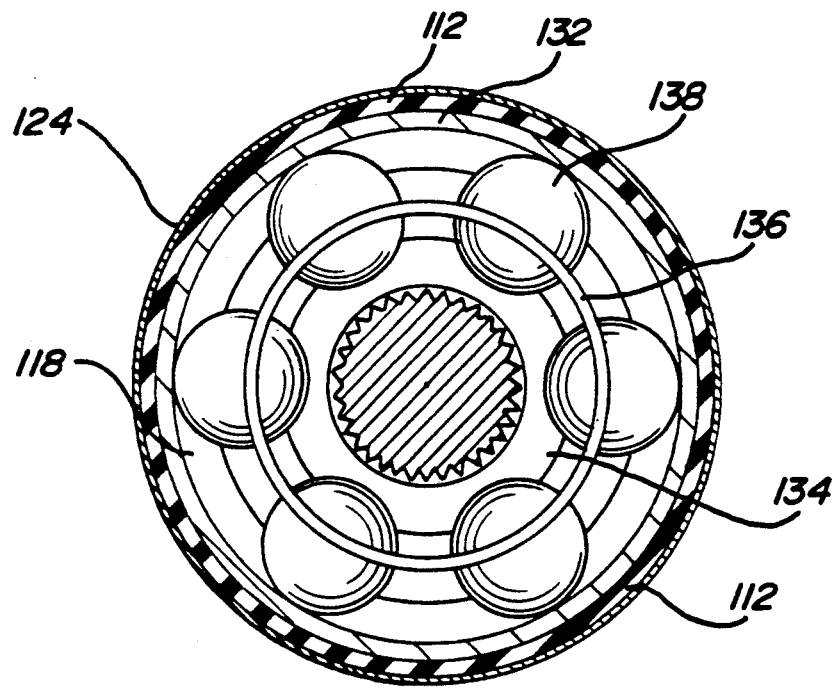
FIG. 4 is a sectional view of FIG. 3 taken along line 4—3 thereof.
Figure 5:
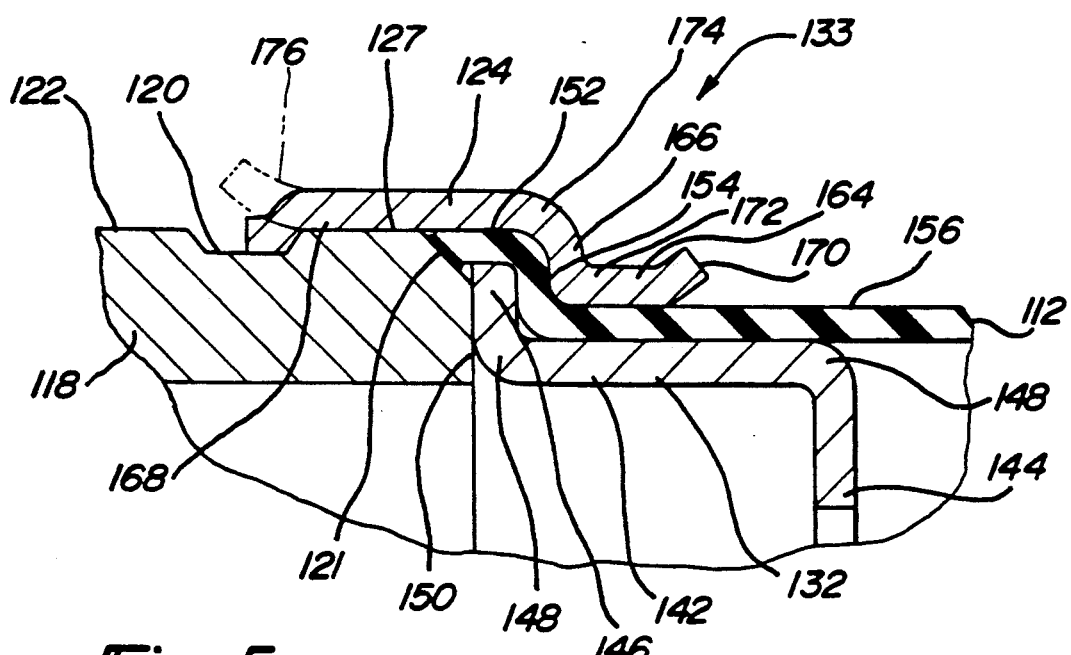
FIG. 5 is an enlarged view of the circular area shown in FIG. 3.

FIGS. 3, 4 and 5 illustrate a constant velocity universal joint 110 in accordance with the present invention. The constant velocity universal joint 110 includes a joint outer race 118, joint inner race 134, joint cage 136, balls 138 and shaft 116. The joint outer race 118 defines a central axis 140. The balls 138 are generally symmetrical about the axis 140.

The outer race 118 terminates with a substantially flat end surface 150. A circumferential chamfer 121 is formed in the outer surface 122 of the outer race 118 adjacent the end surface 150. Also, a circumferential groove 120 is formed in the outer surface 122 separated from the chamfer 121 by a plateau portion 127. The chamfer 121 and the groove 120 cooperate to retain and seal the boot 112 as will be explained herein.

The boot retaining and sealing mechanism 133 includes a pair of annular bands 132 and 124. Both of the annular bands 132 and 124 are positioned substantially coaxial with the central axis 140.

The inner band 132 has an annular section 142 and a pair of flanges 144 and 146 at respective ends of section 142. The flanges 144 and 146 are generally perpendicular to the central axis 140. The first flange 144 extends radially inward towards the central axis 140 while the second flange 146 extends radially outward away from the central axis 140. Both flanges 144 and 146 are continuous with the annular section 142 and are joined therewith by radiused sections 148.

The first flange 144 extends a desired distance towards the central axis 140 to retain the internal components 134, 136 and 138 within the outer race 118. The distance is also small enough not to impede the angular movement of the shaft 116. The second flange 146 extends a desired distance away from the central axis 140 to locate the inner band 132 on the end face 150. However, the second flange 146 does not extend above the circumferential chamfer 121 of the outer housing 118.

The boot 112 has a first annular section 152, a flange section 154, a second annular section 156, a bellows section 155 and a third annular section 157. The first annular section 152 is substantially coaxial with the axis 140. This first annular section 152 has a desired diameter such that it has an interference fit with the circumferential chamber 121 of the housing 118 as seen in FIG. 5. The interference fit provides a seal between the boot 112 and the outer race 118.

The flange section 154 extends radially inwardly towards the axis 140 from the annular section 152. The flange section 154 contacts the flange 146 as seen in FIG. 5. The second annular section 156 extends from the flange section 154 and is coaxial with the axis 140. The second annular section 158 has a desired diameter to enable a slight interference fit with the annular section 142 of the inner retaining band 132. The interference fits aid in sealing and retaining the boot 112 with the housing 118.

The outer band 124 has a first annular section 164, a flange section 166 and a second annular section 168. The first annular section 164 has a desired diameter to enable a slight interference fit with the annular section 156 of the boot 112, thus sandwiching the boot section between inner and outer bands 132 and 124. The free end 170 of the first annular section 164 may be flared radially outward to present a friendly surface to the boot 112 if desired.

The other end of the first annular section 164 is continuous with a flange section 166 via a radiused section 172. This flange section 166 traps or sandwiches the boot flange section 154 between the inner band flange section 146 and the outer band flange section 166.

The other end of the flange section 166 is continuous with the second annular section 168 via a radiused section 174. This annular section 168 has a desired diameter to enable a slight interference fit between itself and both the boot first annular section 152 and the plateau portion 127. The free end 176 of the second annular section 168 may also be flared radially outward to facilitate assembly as shown in phantom in FIG. 5.

During assembly, the band 132 is placed directly against the open face 150 of the joint outer race 118. The boot 112 is positioned over the inner band 132. The outer band 124 is positioned over the boot 112. Sufficient pressure is applied to the flange section 166 of the outer band 124 to seat the inner band 132 on the face 150 of the joint outer race 118. The force also compresses the boot 112 to create a seal between the inner joint band 132 and outer joint band 124. Further, the force compresses the free end of the boot at the junction of the flange 146 and chamfer 121 to further seal the housing 118.

The free end 176 of the outer band 124 is rolled by conventional means into the groove 120 while the pressure is maintained against the outer band 124. The rolled end 176 retains the boot 112 onto the housing 118 as seen in FIGS. 3 and 5.

Figures 1, 2:
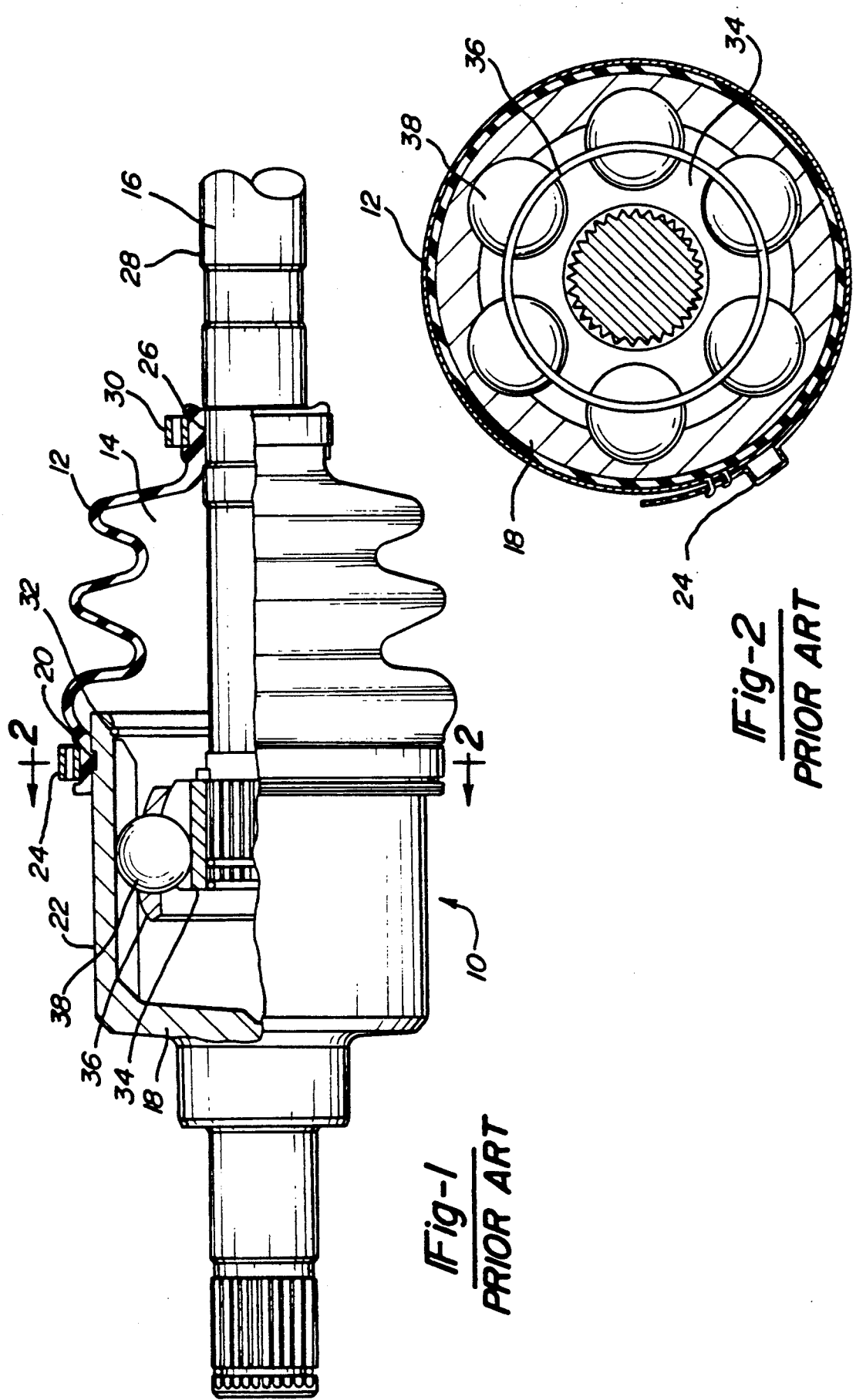
FIG. 1 is a side elevation view partially in cross section view of a typical constant velocity universal joint showing the prior art sealing arrangement.
FIG. 2 is a sectional view of FIG. 1 taken along line 2—2 thereof.

The shaft end of the boot bellow portion 155 and the annular portion 157, are the same as shown in FIGS. 1 and 2. The boot 112 is located in a groove 126 located on the outer surface 128 of the shaft 116. A clamp 30 is provided to retain the boot 112 on the shaft 116 and provide a sealing engagement between the boot 112 and the groove 126.

While the above detailed description describes the preferred embodiment of the present invention, it should be understood that the present invention is susceptible to modification, variation and alteration without deviating from the scope and fair meaning of the subjoined claims.

What is claimed is:

1. A two piece boot retainer for a mechanical joint comprising:
   an annular inner band rotatable with said mechanical joint, said annular inner band having a first end and a second end and defining a central axis, said annular inner band having its entire outer diameter smaller than the outer diameter of said mechanical joint;
   first flange means located at said second end of said annular inner band and extending away from said central axis, said first flange means abutting a face of an outer member of said mechanical joint;
   an annular outer band rotatable with said mechanical joint, said annular outer band having a first end and a second end, said second end fixably attached to and surrounding said mechanical joint, said first end of said annular outer band surrounding said second end of said annular inner band;
   second flange means located at said first end of said annular outer band and extending towards said central axis;
   a portion of a boot sandwiched between said annular inner band and said annular outer band for sealing said mechanical joint and for retaining said boot on said mechanical joint by said first and second flange means.

2. The boot retainer of claim 1 wherein said annular inner band has a third flange means located at said first end and extending towards said central axis for maintaining assembly of said mechanical joint.

3. The boot retainer of claim 1 wherein said annular outer band has a second annular section having a free end and a second end, said second end attached to the inside of said second flange means, said second annular section extending substantially parallel to said central axis.

4. The boot retainer of claim 3 wherein said free end of said second annular section is flared away from said central axis.

5. The boot retainer of claim 1 wherein said second end of said annular outer band is flared away from said central axis.

* * * * *

UNITED STATES PATENT AND TRADEMARK OFFICE
CERTIFICATE OF CORRECTION

PATENT NO. : 5,183,351

DATED : February 2, 1993

INVENTOR(S) : Dean J. Schneider

It is certified that error appears in the above-identified patent and that said Letters Patent is hereby corrected as shown below:

Column 2, line 21, "FIGURE" should be ---FIGURES---.

Column 2, line 32, "4-3" should be ---4-4---.

Column 3, line 12, "chamber" should be ---chamfer---.

Signed and Sealed this

Ninth Day of November, 1993

*Attest:*

BRUCE LEHMAN

*Attesting Officer*  *Commissioner of Patents and Trademarks*